United States Patent [19]

Bagby et al.

[11] 4,289,090

[45] Sep. 15, 1981

[54] ELECTROSTATICALLY ISOLATED CARRIER FOR PAINTING APPARATUS

[75] Inventors: Thomas L. Bagby, Washington; Gale C. Coombs, Peoria, both of Ill.

[73] Assignee: Caterpillar Tractor Co., Peoria, Ill.

[21] Appl. No.: 117,729

[22] PCT Filed: Dec. 26, 1979

[86] PCT No.: PCT/US79/01131
§ 371 Date: Dec. 26, 1979
§ 102(e) Date: Dec. 26, 1979

[87] PCT Pub. No.: WO81/01804
PCT Pub. Date: Jul. 9, 1981

[51] Int. Cl.³ .............................................. B05B 5/02
[52] U.S. Cl. .................................. 118/630; 118/500; 339/9 R
[58] Field of Search ............................ 118/500–503, 118/629–635; 269/46; 294/81 R; 198/678; 19/42; 339/22 T, 9 R

[56] References Cited

U.S. PATENT DOCUMENTS

| | | | |
|---|---|---|---|
| 2,146,390 | 2/1939 | White | 269/46 X |
| 2,207,860 | 7/1948 | Hassler | 191/42 |
| 2,626,301 | 1/1953 | Hammerly | 339/22 T X |
| 2,805,642 | 9/1957 | Tuttle et al. | 118/633 X |
| 3,113,037 | 12/1963 | Watanabe | 118/635 X |
| 3,155,207 | 11/1964 | Blemly et al. | 339/22 T |
| 3,345,471 | 10/1967 | Kilburg | 339/22 T X |
| 3,788,680 | 1/1974 | Brown | 294/81 R |
| 3,852,017 | 12/1974 | Derror | 294/81 R X |
| 3,937,180 | 2/1976 | Wiggins | 118/635 |
| 4,114,765 | 9/1978 | Kojima | 269/46 X |

FOREIGN PATENT DOCUMENTS

| | | | |
|---|---|---|---|
| 40145 | 7/1965 | German Democratic Rep. | 294/81 |
| 1120049 | 7/1968 | United Kingdom | 294/81 R |
| 614005 | 7/1978 | U.S.S.R. | 294/81 R |

Primary Examiner—Morris Kaplan
Attorney, Agent, or Firm—Phillips, Moore, Weissenberger, Lempio & Majestic

[57] ABSTRACT

In electrostatic coating apparatus, a conveyor supporting a carrier having workpiece-support suspension means attached thereto. The carrier includes a rail member, a pair of electrically insulative sleeve members adjustably slidable on said rail, a metallic tubular member having an electrical contact thereon mounted on each sleeve, and the suspension means attached to the tubular members.

8 Claims, 3 Drawing Figures

ELECTROSTATICALLY ISOLATED CARRIER FOR PAINTING APPARATUS

DESCRIPTION

1. Technical Field

This invention relates generally to an electrostatic painting apparatus and more particularly relates to an electrostatically isolated carrier for workpieces which is painted therein.

2. Background Art

Electrostatic painting apparatus are well known in the art for conveying engines and the like through a painting booth. The painting process requires electrostatic isolation of the engine from ground so that a high-voltage electrostatic charge can be applied to it. In conventional practice, a conveyor belt or chain has a bracket attached to it for suspending the engine therefrom. The engine is normally attached to the bracket by an electrically non-conductive hook, coated with a plastic material such as Nylon. Conventional systems of this type are not easily adjustable to accomodate engines of various sizes and, furthermore, the above-described arrangement does not always provide the desired support and electrical isolation. In this respect, it should be understood that the engines may weigh up to 35,000 pounds each.

The present invention is directed to overcoming one or more of the problems as set forth above.

DISCLOSURE OF INVENTION

In one aspect of the present invention, an electrostatic painting apparatus includes a conveyor and a carrier attached to the conveyor and having suspension means for attaching a workpiece thereto. The improvement in the suspension means of the apparatus comprises at least one pair of adjustable bracket means for attachment to the workpiece to selectively adjust the linear distance between the bracket means.

Each bracket means includes an electrically insulative first sleeve slidably mounted on a support rail, a second sleeve mounted on the first sleeve and carrying electrical contact means, and electrical power means operatively associated with the workpiece through the bracket means. In another aspect of this invention, the bracket means is disclosed and claimed as a sub-combination.

The improved apparatus of this invention thus provides for the precise adjustment of the bracket means relative to each other to accomodate engines of various sizes, and further provides a system which effectively electrically isolates the painted workpiece from ground for application of a high-voltage electrostatic charge thereto. In addition, the apparatus exhibits a high degree of structural integrity and ability to be disassembled for servicing purposes.

BRIEF DESCRIPTION OF THE DRAWINGS

Other objects and advantages of this invention will become apparent from the following description and accompanying drawings wherein.

BEST MODE OF CARRYING OUT THE INVENTION

Figure 1:
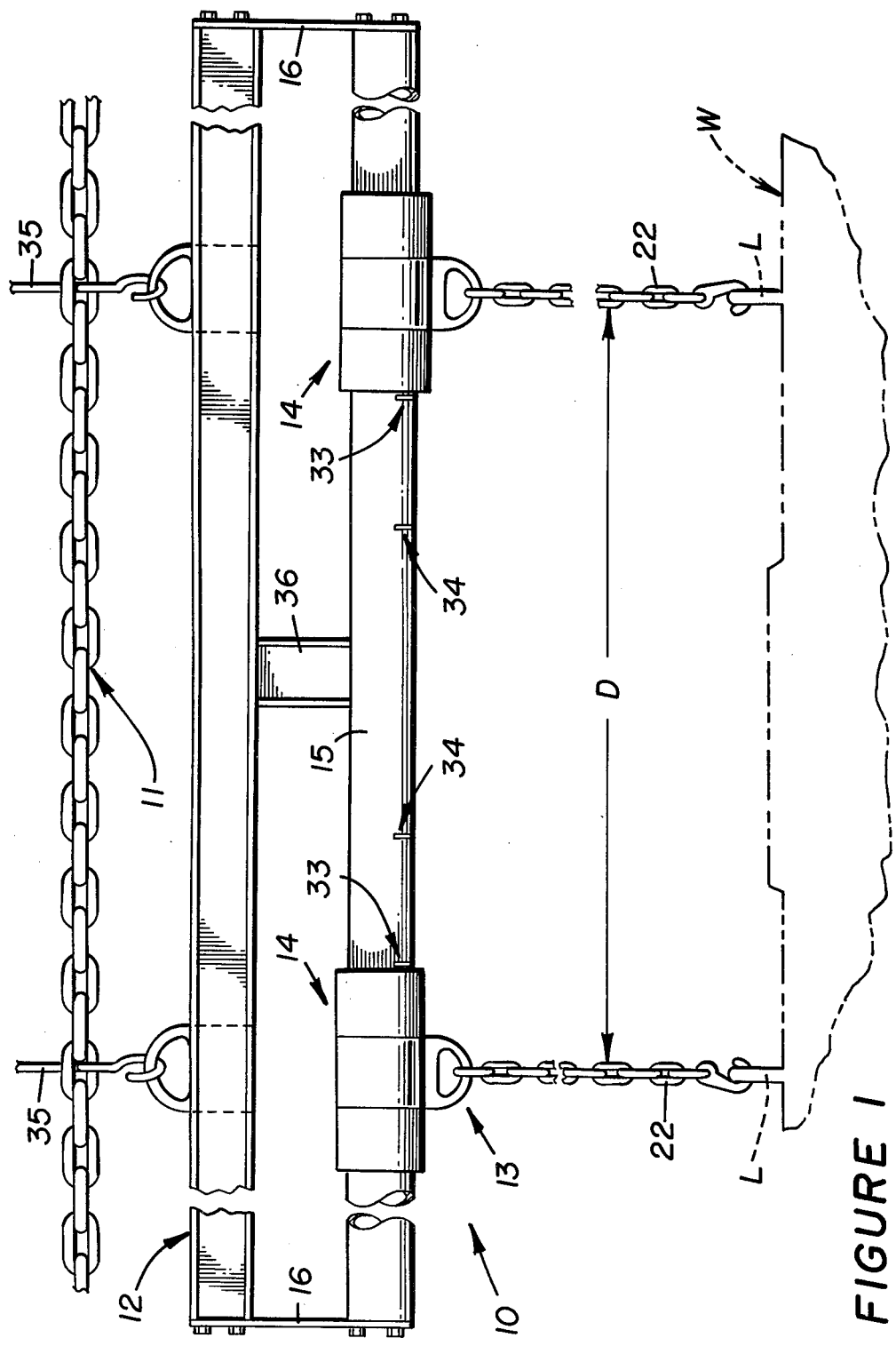
FIG. 1 is a side elevational view partially illustrating an electrostatic painting apparatus embodying the present invention.

FIG. 1 partially illustrates an electrostatic painting apparatus 10 including an overhead conveyor or chain 11 having a carrier 12 attached thereto and suspended therefrom. As described more fully hereinafter, carrier 12 includes suspension means 13 comprised of a pair of longitudinally spaced and adjustable brackets 14 slidably mounted on a support rail or tube 15 for attaching a workpiece W to carrier 12. The workpiece may comprise an engine, for example, with the adjustable feature of brackets 14 permitting the suspension of engines of various sizes below carrier 10 for painting purposes. In painting systems of this type, the engine is required to be electrically insulated from ground so that a high-voltage electrostatic charge can be applied to it during the painting process.

Figure 2:
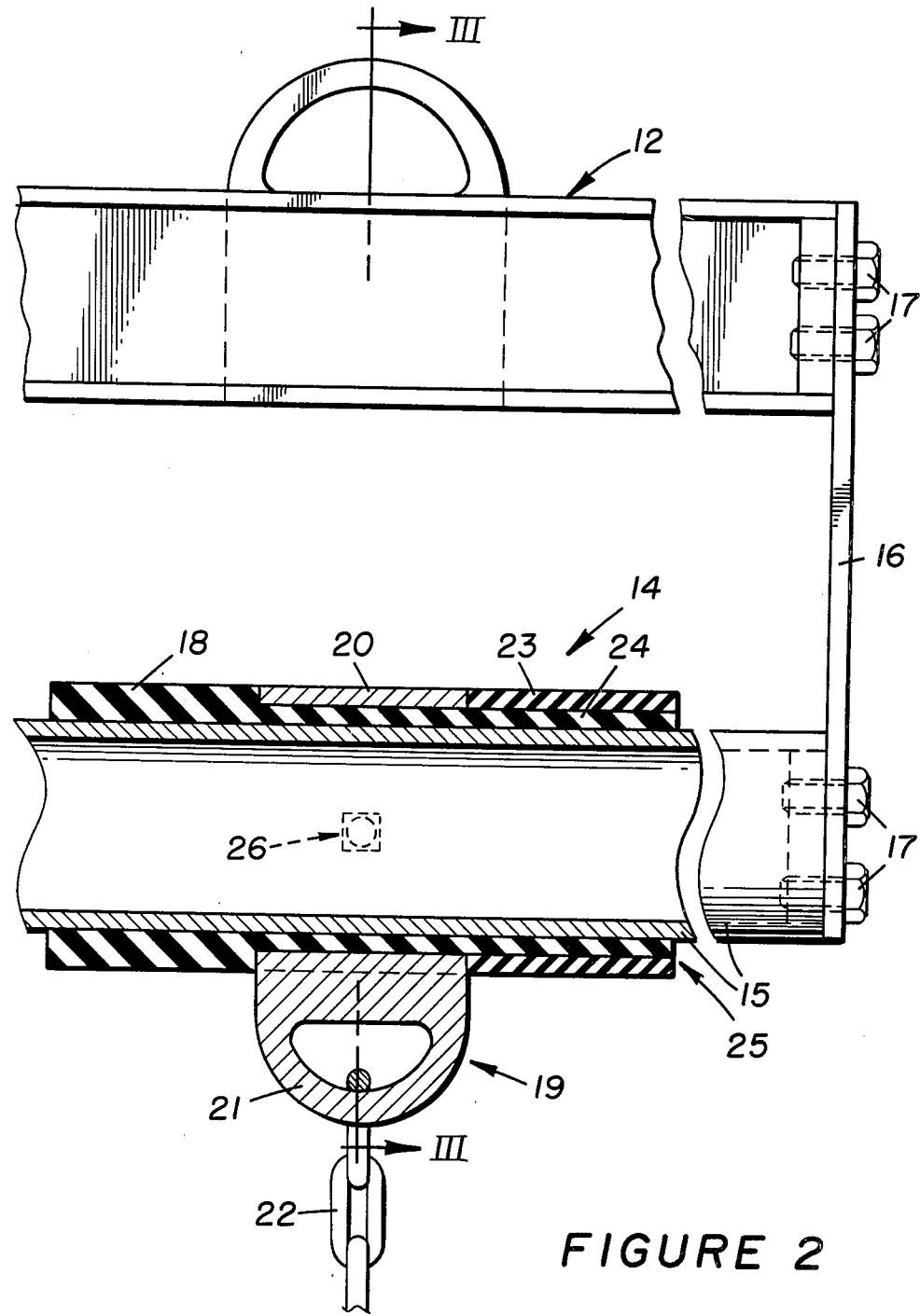
FIG. 2 is an enlarged, partially-sectioned view illustrating an adjustable support bracket employed in the apparatus.
Figure 3:
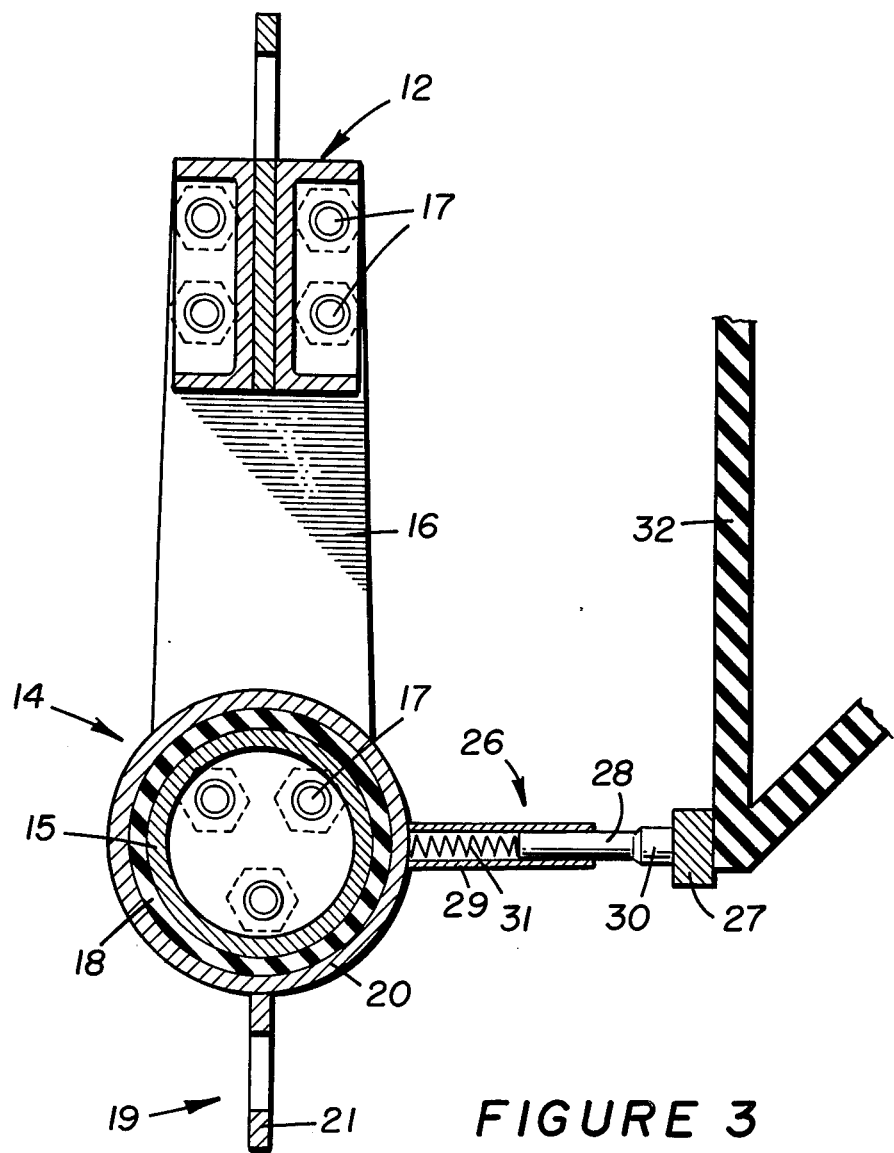
FIG. 3 is a sectional view, taken in the direction of arrows III—III in FIG. 2, illustrating the bracket and a spring-loaded electrical contact secured thereon.

Referring to FIGS. 2 and 3, an end plate 16 is releasably secured to each end of carrier 12, including tube 15, by plurality of bolts 17. In addition to adding to the overall structural integrity of apparatus 10, the removability feature of end plate 16 facilitates the further removal of bracket 14 for replacement or repair purposes. Each bracket 14 includes a plastic sleeve 18 which may be composed of polypropylene or Nylon with the former material having a compressive strength in the range of 8,500-10,000 p.s.i. and the latter material having a compressive strength in the range of 6,700-14,000 p.s.i., depending upon the type of material used. A multiple safety factor will be thus built into the apparatus to accomodate it for loads in the range of 35,000 pounds, which is the approximate weight of a large engine package.

An attachment means 19, shown in the form of a cylindrical metallic sleeve 20 having an eye shackle 21 secured thereunder, is mounted on sleeve 18 for attaching workpiece W (FIG. 1) thereto, via a chain 22. A second electrically non-conductive plastic sleeve 23 is mounted, along with sleeve 20, on a reduced diameter portion 24 of sleeve 18 to retain attachment means 19 in a secured position on sleeve 18. Sleeve 23 may be bonded or otherwise suitably secured to sleeve 18 and both sleeves may exhibit dielectric strengths in the range of 420 volts per mil.

It should be further noted in FIG. 2 that end portions 25 of sleeves 18 and 23 will provide a "bumper" to prevent metallic attachment means 19 from moving too close to grounded end plate 16 to prevent "spark over." Referring to FIG. 3, an electrical contact means 26 is secured to a backside of sleeve 20 for receiving and conducting electrical current from a metallic rub bar 27 to the sleeve. Contact means 26 comprises a plunger 28 reciprocally mounted in a housing 29 secured to sleeve 20 and having a rub button 30 secured on the end thereof to slidably contact rub bar 27 upon movement of carrier 12 through the painting area. A compression coil spring 31 is mounted in housing 29 to urge rub button 30 into such sliding contact with rub bar 27. Rub bar 27 is suitably secured to an electrically non-conductive plastic support 32.

INDUSTRIAL APPLICABILITY

As shown in FIG. 1, apparatus 10 is particularly adapted for conveying a workpiece W, such as an engine, through a painting area via chain conveyor 11. The engine must be electrically insulated and isolated from chain 11 and the metallic framework of carrier 12, which are composed of steel or the like. Since the engines may weigh in the range of 35,000 pounds apiece, the apparatus must also provide a high degree of structural integrity due to the high magnitude of carrying loads imposed thereon.

Prior to suspending the engine from carrier 12 via chains 22, brackets 14 are suitably positioned on tube 15 to properly align eye shackles 21 thereof vertically above lifting eyes L of the engine. As further shown in FIG. 1, indicia means 33, shown in the form of notches formed on tube 15, will indicate to the workmen the correct longitudinal spacing D of brackets 14 on the tube for a particular engine size. Additional indicia means or notches 34 may be suitably formed on the tube to accomodate shorter engines having their lifting eyes spaced at a lesser distance D.

When the brackets 14 are properly positioned on tube 15, the engine is lifted by a standard hoist (not shown), after the engine has been attached to chains 22 at lifting eyes L whereby the painting process may proceed to completion. A pair of supporting hooks 35 attach carrier 12 to chain 12 and also to a load-carrying monorail system, via the hoist. Due to the high compressive strength of plastic sleeves 18 and 23 (FIG. 2), the engine will be fully supported on tube 15 which is secured to carrier 12 by means of end plates 16 and a central truss 36 (FIG. 1). During the painting process, rub bar 27 (FIG. 3) will be in the off (dead) state while contact is being made initially with rub button 30 or when such contact is broken.

This arrangement eliminates the possibility of sparks and will further function to drain the electrical charge of the engine to eliminate the need for providing special means for draining the charge after painting. As shown in FIG. 2, the substantial longitudinal separation of ends 25 of sleeves 18 and 23 from metallic ring 20 will prevent any "spark over" between the sleeves and end plate 16 upon engagement of ends 25 with the plate.

Other aspects, objects, and advantages of this invention can be obtained from a study of the drawings, the disclosure, and the appended claims.

We claim:

1. In an electrostatic painting apparatus (10) having a conveyor (11) and a carrier (12) attached to said conveyor and having suspension means (13) for attaching a metallic workpiece thereto, the improvement comprising said suspension means including at least one pair of adjustable bracket means (14) for attachment to a workpiece (W) and for sliding movements on said carrier to selectively adjust the longitudinal spacing (D) between the bracket means, each of said bracket means including a nonmetallic and electrically insulating first sleeve (18) slidably mounted on a support rail (15) of said carrier, a second sleeve (20) mounted on said first sleeve and carrying electrical contact means (26) thereon, workpiece attachment means (19) being attached to the second sleeve, and electrical power means operatively associated with said workpiece through said contact means, second sleeve and attachment means.

2. The apparatus of claim 1 wherein said rail is tubular.

3. The apparatus of claim 2 further including an end plate means (16) for releasably securing each end of said support rail on said carrier and for permitting said bracket means to be slid-off said support rail upon release of said bracket means.

4. The apparatus of claim 1 further including a non-metallic electrically insulating third sleeve (23) secured on a reduced-diameter portion (24) of said first sleeve and wherein said second sleeve is a cylindrical metallic sleeve (20) secured on the reduced diameter portion of said first sleeve and disposed axially between said first and third sleeves.

5. The apparatus of claim 2 further including indicia means (33), defined on said support rail, for indicating the longitudinal spacing between said pair of adjustable bracket means.

6. The apparatus of claim 1 wherein said power means includes a metallic rub bar (27) mounted adjacent to said contact means for engaging said contact means in sliding contact therewith.

7. An apparatus (10) for supporting an electrostatically charged work-piece comprising
a tubular first member (15),
a tubular metallic second member (20),
insulation means (18) for electrically insulating said first and second members from each other, said insulation means (18) including a non-metallic tubular sleeve slidably mounted on said first member and said second member being mounted on said sleeve,
electrical contact means (26), secured to said second member, for receiving and conducting an electrical current to said second member, and
metallic attachment means (19), secured to said second member, for attaching a workpiece thereto.

8. The apparatus of claim 7 wherein said second member is mounted on a reduced section of the first member.

* * * * *